2 Sheets—Sh
J. G. BAKER.
Tincture Press.
No. 220,112. Patented Sept. 30, 1879.
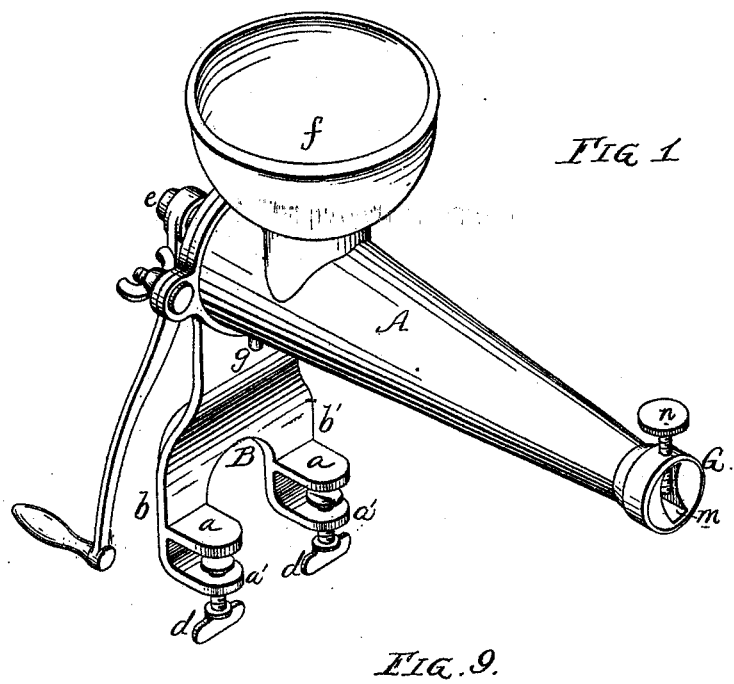
Fig. 1.
Fig. 9.
Fig. 10.
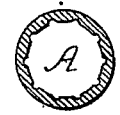
Witnesses
Henry Howson Jr
Harry Smith
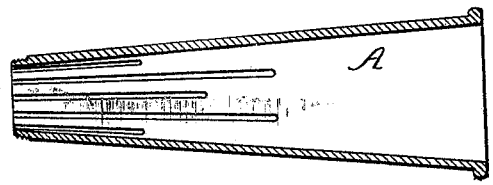
Inventor
John G. Ba
by his Atto
Howson &

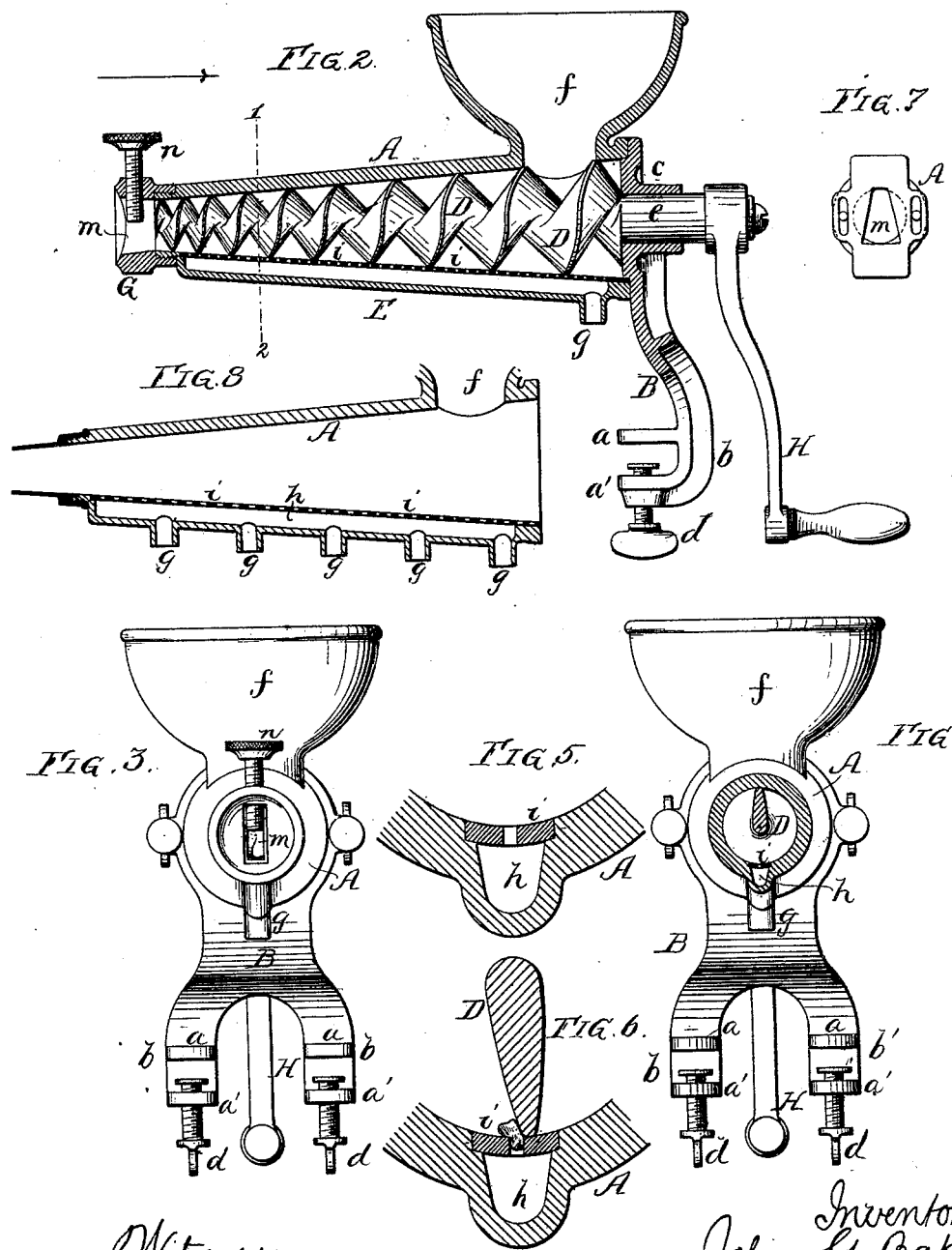

UNITED STATES PATENT OFFICE.

JOHN G. BAKER, OF PHILADELPHIA, PENNSYLVANIA, ASSIGNOR TO THE ENTERPRISE MANUFACTURING COMPANY, OF SAME PLACE.

IMPROVEMENT IN TINCTURE-PRESSES.

Specification forming part of Letters Patent No. 220,112, dated September 30, 1879; application filed September 4, 1879.

*To all whom it may concern:*

Be it known that I, JOHN G. BAKER, of Philadelphia, Pennsylvania, have invented a new and useful Improved Tincture-Press, of which the following is a specification.

My invention consists, mainly, of the combination of a tapering casing, having a hopper, outlet, and perforations, with a tapering screw, the thread of which fits snugly, but so as to turn freely, in the said casing, all substantially as described hereinafter, so as to form a tincture-press for straining liquids from medicinal decoctions, juices from berries, &c.

My invention further consists of sundry improvements made with the view of increasing the efficacy of the screw, regulating the pressure which it imparts to the substances acted on, maintaining the perforations clear of obstructions, and for the attainment of other advantages too fully set forth hereinafter to need preliminary explanation.

Figure 1, Sheet 1, is a perspective view of the tincture-press; Fig. 2, Sheet 2, a vertical section; Fig. 3, an end view looking in the direction of the arrow; Fig. 4, a transverse section on the line 1 2; Figs. 5 and 6, enlarged sectional views illustrating my invention; Figs. 7 and 8, modifications of parts of the machine, and Figs. 9 and 10 views illustrating another modification.

A tapering casing, A, preferably of cast-iron, is secured at its largest end to a stand, B, having two legs, $b\ b'$, each provided with two lugs, $a\ a'$, one of which has a screw, $d$, so that both legs may be clamped to a table.

The upper portion, $c$, of the stand B forms the cover for the large end of the casing, and also serves as a bearing for the journal $e$ of the tapering screw D, the said journal being provided with a suitable handle, H.

The edge of the thread of the screw fits snugly, but so as to turn freely, in the interior of the casing, which, near its large end, is provided with a hopper, $f$.

On the under side of the casing is a hollow rib, E, within which is a chamber or channel, $h$, (best observed in the enlarged views, Figs. 5 and 6,) this chamber being closed near the small end of the casing, and terminating near the large end of the same, where, as shown in Fig. 2, there is a single outlet, $g$.

In the modification, Fig. 8, however, there are a number of outlets, for a purpose explained hereinafter.

The chamber communicates with the interior of the casing through small perforations in a plate, $i$, which fits snugly on ledges, as shown in Figs. 5 and 6, and which is held in place longitudinally by the cover of the large end of the casing.

It is important, for reasons set forth hereinafter, that the upper surface of the plate $i$ should be concave transversely, and form a continuation of the surface of the interior of the casing.

The small end of the said casing is provided with means whereby its outlet $m$ may be contracted or enlarged, the device shown in Figs. 1, 2, and 3 consisting of a simple screw, $n$, which, on being turned in one direction, diminishes the area of the outlet, the latter being increased on turning the screw in the opposite direction. Other devices may be used for this purpose. For instance, a vertically-adjustable plate, $n'$, may be secured in front of the outlet, the plate having the triangular opening shown in Fig. 7.

I prefer to provide the small end of the casing with a detachable ring, G, in which is the outlet $m$, the ring being, in the present instance, screwed to its place, so that it can be readily withdrawn to make way for a nozzle or other attachment which it may be desirable to connect to the casing.

The chamber $h$ and removable plate $i$ may be dispensed with, providing minute holes are bored through the casing; but I prefer the said chamber and plate, for the reason that it is much more economical to make small holes through a thin plate than through a thick cast-iron shell, and for the further reason that plates with perforations of different sizes to suit different substances can be readily fitted to the casing.

It will be observed, on referring to Fig. 2, that the thread of the screw D has a differential pitch, the pitch gradually decreasing from the large to the small end of the screw, thereby forming within the casing a spiral channel gradually decreasing in size.

The substances from which the liquid matter has to be strained are placed in the hopper, and the screw is turned in such a direction that the thread will have a tendency to withdraw the substances from the said hopper, and force them through the tapering spiral channel formed by the screw within the casing, in doing which the pressure on the substances will gradually increase as they approach the small end of the casing, the liquid matter thus forced from the materials meanwhile passing through the perforated plate into the chamber $h$ and from the outlet $g$, while the residual matter passes off through the outlet $m$.

The extract from some substances is of such a thick semi-fluid character that it cannot be easily disposed of through one outlet $g$. Hence, when the machine is required for general use, in operating on a variety of substances I make a number of outlets from the chamber $h$, as shown in Fig. 8.

Some materials and substances may require a greater pressure than others in order to thoroughly strain the liquids from them, and the desired variations of pressure can be easily attained by regulating the area of the outlet $m$, the smaller the outlet the greater the pressure, and the pressure diminishing as the area of the outlet is increased.

The difficulty with machines of the class to which my invention relates has been the choking of the perforations with small particles, such, for instance, as the seeds of berries—a difficulty which is obviated by my improvements in the following manner:

As before remarked, the edge of the thread of the screw D fits snugly in the interior of the casing, of which the upper surface of the plate is a continuation. Hence any particles which obstruct the perforations will be swept away therefrom by the edge of the screw; or if particles have stuck fast in the perforations, as shown in Fig. 5, they will be cut off by the combined action of the rigid edge of the thread and the edges of the perforations, whatever may be left behind in the latter being easily forced out with the liquid.

When the machine is designed for operating on slippery substances, it is advisable to make grooves in the interior of the casing, as shown in Figs. 9 and 10, these grooves being either straight or spiral.

The two legs of the stand, each provided with a clamping device, impart a steadiness to the whole machine in the right direction—that is, the direction best adapted to resist the force applied to the handle.

The casing can be readily detached from the stand, so as to expose the screw, allow the perforated plate to be withdrawn, and the latter, with other parts of the machine, to be cleansed.

Many different substances may be operated on by the machine. It may be applied, for instance, to the extracting of tinctures from medicinal decoctions, or to the straining of the juices from berries in making jellies.

I do not desire to claim, broadly, a straining-machine in which pressure is imparted to substances by means of a screw acting in a casing to which the substances are admitted; but

I claim as my invention—

1. The combination of the tapering casing A, its hopper $f$, outlet $m$, and perforations with the metal screw D, having a thread, the edge of which fits snugly, but so as to move freely, in the said casing, all substantially as set forth.

2. The screw D, having a pitch gradually decreasing from the large end, in combination with the casing A, its hopper, perforations, and outlet $m$, all substantially as described.

3. The combination of the screw and casing with the detachable perforated plate $i$, the surface of which is a continuation of the inner surface of the said casing, substantially as described.

4. The combination of the screw, detachable perforated plate, and casing, having a hollow rib, in which is a chamber, $h$, all substantially as set forth.

5. The combination of the casing, screw, and detachable perforated plate with the cover $c$, by which the said plate is retained in place, as set forth.

6. The combination of the tapering screw with tapering casing, grooved internally, as specified.

7. The combination of the tapering casing with the detachable piece G, in which is the outlet $m$, as specified.

8. The combination of the casing and its screw with a stand, B, having two clamping-legs, and being arranged to close the large end of and form the support for the casing, and to serve as a bearing for the journal of the screw, all substantially as set forth.

In testimony whereof I have signed my name to this specification in the presence of two subscribing witnesses.

JOHN G. BAKER.

Witnesses:
 ALEX. PATTERSON,
 HARRY SMITH.